Figure 1:
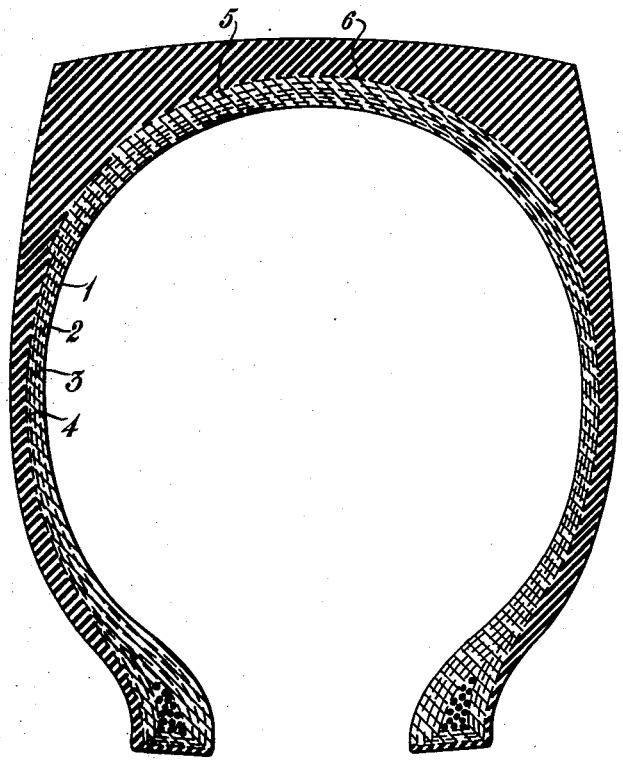

Nov. 11, 1941.   B. J. HUMPHREY   2,262,608
COMPOSITE ARTICLE AND METHOD OF MAKING THE SAME
Filed Dec. 16, 1938

INVENTOR
Bingham J. Humphrey
BY
ATTORNEYS

Patented Nov. 11, 1941

2,262,608

UNITED STATES PATENT OFFICE 2,262,608

COMPOSITE ARTICLE AND METHOD OF MAKING THE SAME

Bingham J. Humphrey, Akron, Ohio, assignor to The Firestone Tire & Rubber Company, Akron, Ohio, a corporation of Ohio Application December 16, 1938, Serial No. 246,116

10 Claims. (Cl. 154—40)

This invention relates to composite articles and to methods of making the same, and more especially it relates to composite articles composed of rubber and cellulosic threads, filaments, cords, fabrics and the like, and to procedure for securing a superior bonding of the rubber to such cellulosic materials.

The problem of obtaining a firm bonding of rubber to cellulosic materials, particularly to regenerated cellulose (rayon) cords and fabric, is of long standing in the rubber industry. For many years it has been standard practice to units cotton fabric to compounded rubber by calendering and then to use the resulting rubberized fabric in the plies of automobile tires, driving belts (e. g., automobile fan belts) and similar laminated rubber-fabric articles. When service conditions were not too severe, composite articles so made were satisfactory. Recently, however, the tendency of the transportation industry and of the public in general has been to subject automobile tires to increasingly more severe service conditions. In all types of automobile traffic higher speeds are now used, with the consequent development of higher temperatures and higher stresses in the tires. It is not surprising, therefore, that more difficulty with tire failures due to inadequate body strength has occurred in recent years.

Tires with slightly improved body strength under severe service conditions have been made by employing cotton fabric which had previously been impregnated, by dipping or otherwise, with a solution or dispersion of rubber, prior to calendering the compounded rubber onto the fabric. However, this improvement has not been sufficient to meet the desires of tire users.

There have been many attempts in the rubber industry to displace cotton tire fabric with rayon fabric. These attempts have been generally unsuccessful because of the poor adhesion obtaining when rayon fabric is given the same treatment usually given to cotton tire fabric. Thus, if rayon cord is pressed into a rubber tire body composition and then cured at high pressure and at an elevated temperature sufficient to vulcanize the rubber completely, it will be observed that the rayon cord can be pulled away from the rubber with comparative facility. In fact, the adhesion so obtained is less than half that obtained when cotton cord is used. Likewise, although some improvement is made when the rayon is first impregnated with a rubber solution or dispersion, the adhesion is still less than half the adhesion of a similarly impregnated cotton cord, and is insufficient for satisfactory performance in a tire. By practicing the present invention it is now possible to utilize rayon fabric satisfactorily for reinforcing composite rubber-fabric articles such as tires.

Moreover, it has been discovered that by practicing the present invention with conventional cotton fabric or cords vastly improved cotton reinforced rubber articles are produced. Thus, rubber tires and driving belts made according to the present invention are far superior in strength and flexing life to any such articles formerly produced.

The chief objects of the invention are to obtain improved adhesion of rubber to cellulosic threads, filaments, cords, fabrics and the like; to provide an improved adhesive for bonding rubber to cellulosic material; to provide an improved method for bonding rubber to cellulosic material; to provide an improved composite article of rubber and rayon cord or fabric, such as a tire; and to provide an improved composite article of rubber and cotton cord or fabric, such as a tire.

Figure 2:
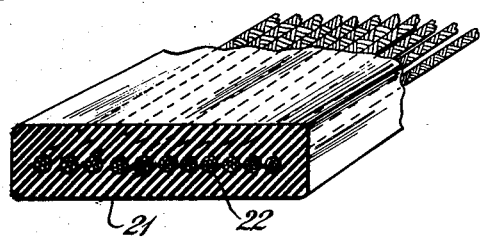

Figure 1 of the accompanying drawing, which is for illustrative purposes only, is a cross-sectional view of a tire embodying the present invention; and Figure 2 is a cross-sectional view of a fabric-reinforced rubber belt, in the manufacture of which the invention is advantageously employed.

The invention consists essentially in applying to cellulosic materials, such as cords, fabric or the like, a novel treating composition, whereby to improve the adhesion between the cellulosic material and rubber after their combination and vulcanization of the rubber. Said treating composition is composed of certain synthetic resins admixed with rubber in the mass, in solvent solution or in aqueous dispersion. Preferably said synthetic resins are of the class known as synthetic drying oils known and marketed under the name of "S. D. O." The latter is prepared by the partial polymerization of divinyl-acetylene, $CH_2=CH—C\equiv C—CH=CH_2$. Mono-vinyl-acetylene, $CH_2=CH—C\equiv CH$, its homologs or homologs of divinyl-acetylene may be employed with substantially similar results.

"S. D. O." is a non-volatile liquid, soluble in such common solvents as toluene, xylene and solvent naphtha. It has the property of drying out rapidly into a hard, somewhat brittle, resinous solid. It absorbs oxygen from the air similarly to a natural drying oil, but much more rapidly, and concurrently polymerizes to form a hard, inelastic resin. No organic solvent for this resin has been found. It is also impervious to moisture and resistant to acids, alkalies and other corrosive agents. The hard resin is amorphous and has a specific gravity of 1.0. It is not thermoplastic and is unaffected by temperatures up to 392° F. (200° C.), but at higher temperatures thermal decomposition sets in.

The invention contemplates a treating composition comprising S. D. O. (or an equivalent as defined above) and rubber (or other rubber-like material, such as polymerized butadiene, chloroprene or the like) in the mass, in a solvent solution or aqueous dispersion. The concentration of S. D. O. or rubber in the composition may vary over a wide range. It has been found advantageous to employ ratios of S. D. O. to rubber in the treating composition of less than 1:1. Ratios of S. D. O. to rubber in the range of 1:2 to 1:6 have been found most satisfactory. Vulcanizing agents, accelerators, activators, and/or other rubber compounding ingredients may be present in the treating composition or not, as desired, since their presence neither greatly adds nor detracts from results obtainable in their absence.

It has been found necessary to dry the fabric after impregnation with the treating composition, in order to remove the dispersing solvent (if a liquid composition has been used) and set the S. D. O. resin. The latter effect may be accomplished merely by allowing the fabric to air-dry for a suitable time. This time may be greatly reduced by heating in air or other oxygen-containing gas. Moreover, the time necessary for causing the resin to set may be reduced by incorporating certain oxidizing agents and/or catalysts in the treating composition, such as benzoyl peroxide.

The following examples are given by way of illustration only and are not to be construed as limiting the invention.

Example 1

A sufficient amount of a 60% naphtha solution of S. D. O. was added to a gasoline cement containing 11% of rubber to make a treating solution in which the ratio of S. D. O. to rubber was 1:4. Rayon tire cords were impregnated with this solution and then dried in air at 105° C. for a period ranging between 30 minutes and 16 hours. Two or more sections of each cord were then laid on a 5 by 5⅝ inch pad made by calendering to an overall gage of 0.080 inch a usual tire body composition onto square woven fabric as a backing. The pads, with cords pressed into the gum side, were cured in a 5 by 6 by 0.075-inch mold to vulcanize the rubber, untreated rayon cords and ordinary rubber-cement impregnated cotton cords being included as controls. The adhesion of each cord was determined on the Scott cord tensile-testing machine. The average pull, in pounds, required to remove the cord from the pad (180° angle) at a steady rate gives a roughly quantitative evaluation of the adhesion. The adhesion value for the treated rayon cords was 1.8 pounds; for the conventional rubber impregnated cotton cords, 1.45 pounds; and for untreated rayon cords, 0.5 pound.

Equivalent results were obtained with rayon cord impregnated in treating solutions in which the S. D. O. to rubber ratio was 1:3 or 1:5. Adhesion values of approximately 1.5 pounds were obtained with rayon cord impregnated with treating solutions in which the S. D. O. to rubber ratio was 1:2 or 1:6.

Treating compositions having the same S. D. O. to rubber ratios but varying in rubber content from 7.5 to 15% gave results practically identical with the above.

Other organic solvents for rubber, such as benzene, toluene, carbon tetrachloride, or the like, may be successfully substituted for gasoline in the above-described rubber cement.

Example 2

A 25% emulsion of a 60% naphtha solution of S. D. O. in water with ammonium oleate as an emulsifying agent was added to a 10% ammonia-preserved rubber latex to make a treating composition in which the S. D. O. to rubber ratio was 1:4. Rayon tire cord was impregnated with said composition, air-dried and then heated in air at 105° C. for a period ranging from 30 minutes to 16 hours. The adhesion of the treated rayon cords, as determined by the test described in Example 1, was 2.2 pounds, as compared to 0.65 for rayon cord impregnated with a conventional latex impregnating composition.

Equivalent results were obtained with rayon cord impregnated with latex treating compositions in which the S. D. O. to rubber ratio was 1:3 or 1:5. Adhesion values of approximately 1.75 pounds were obtained with rayon cord impregnated with compositions in which the S. D. O. to rubber ratio was 1:2 or 1:6.

Treating compositions having the same S. D. O. to rubber ratios but varying in rubber content from 7.5 to 15% gave results practically identical with the above.

Other water dispersed rubber compositions, such as dispersed reclaimed rubber, may be employed instead of rubber latex to prepare an S. D. O.-rubber liquid treating composition suitable for practicing the present invention.

Example 3

Cotton tire cord impregnated either with the improved solvent cement of Example 1 or the improved latex cement of Example 2 gave adhesion values averaging 1.95 pounds, when the S. D. O. to rubber ratio was in the range of 1:3 to 1:5. This value compares favorably with the value of 1.45 pounds for a conventional rubber impregnated cotton cord.

Example 4

Cotton tire cord fabric was impregnated with an improved solvent rubber cement, similar to that described in Example 1, in which the S. D. O. to rubber ratio was 1:4. The impregnated fabric was dried and heat-treated as in previous examples and then incorporated in the body of two 32 x 6 inch truck tires of conventional design. The vulcanized tires were tested on a machine, such as that described in United States Patent No. 1,753,175, each being run at a rate of 30 mi./hr. under a load of 2200 pounds. The tires failed by tread separation at 6172 miles and 6456 miles, respectively.

Two control tires were built in exactly the same manner as the above improved tires, the only difference being that cotton tire cord fabric impregnated with rubber by a conventional method in a usual rubber cement was employed. On testing by the method just described the control tires failed by tread separation at 3919 miles and 3410 miles, respectively.

Referring to the drawing, Figure 1 is a cross-sectional view of an automobile tire, such as the tires described in Example 4. In the body of the tire, body plies 1, 2, 3 and 4 and tread plies 5 and 6 are suitable tire cord fabric of cellulosic material, such as rayon or cotton, which has first been impregnated by treating with the improved rubber-S. D. O. composition according to the present invention and then coated with a body rubber composition by a conventional method (e. g., by calendering) prior to the building of the tire. The tests on such a tire shown in Example 4 fully demonstrate the superiority of tires made in accordance with the present invention over ordinary tires when submitted to conditions of extremely hard service. These tests show that much longer satisfactory service is rendered by tires in which the adhesion between the reinforcing cellulosic fabric and the body rubber is improved by the methods of the present invention. Tires made in accordance with the present invention run cooler than conventional tires. It is probably the cooperation of this characteristic with that of improved strength which makes the improved tires more satisfactory.

Figure 2 is a view, partly in cross-section and partly in perspective, of a cord-reinforced rubber driving belt as made by the methods of the present invention. The reinforcing cord 21, which has first been impregnated with the S. D. O.-rubber adhesive, is embedded in a suitable rubber composition 22, and the whole is cured to vulcanize the rubber. Much longer life is obtained with the improved belt than with a conventional belt of the same design.

A treating composition comprising rubber and S. D. O., which composition contains insufficient dispersive liquid (such as organic solvent or water) to give it liquid properties, may also be employed in practicing the invention by spreading or calendering said composition onto the fabric in such a way that the fabric is impregnated.

In the appended claims the term "cellulosic fabric" is understood to mean any thread, filament, cord or fabric of cotton, regenerated cellulose or the like. The term "rubber-like substance" means any of the natural rubbers as well as rubber-like substances such as polymerized 2-chloro-1,3-butadiene and polymerized butadiene compositions. The term "partially polymerized" means that the substance has been polymerized to a non-volatile or thermoplastic condition but is capable of further polymerization to a non-thermoplastic state. The term "set" describes the more highly polymerized condition of the synthetic drying oil after it has been exposed to an oxygen-containing atmosphere, such as air, under such conditions that improved adhesion is obtained when the treated fabric is heated in contact with a vulcanizable rubber composition. When set, the bonding material disclosed herein in defining the novel composite structure, is considered as a film or layer interposed between the cellulosic fibers and the rubber-like material in which they are embedded.

Modification may be resorted to without departing from the spirit of the invention or the scope of the appended claims, which are not to be limited by the specific ingredients set forth or the exact procedures described in the examples.

What is claimed is:

1. The method of making a composite article of rubber and cellulosic fabric which comprises the steps of impregnating said fabric with a composition comprising partially polymerized divinyl acetylene and rubber, the ratio of partially polymerized divinyl acetylene to rubber in said composition being in the range of 1:2 to 1:6 parts by weight, thereafter exposing the impregnated fabric to an oxygen-containing atmosphere to set said partially polymerized divinyl acetylene, and then vulcanizing a rubber composition in intimate contact with the so-treated fabric.

2. The method of making a composite article of rubber and cellulosic fabric which comprises the steps of impregnating said fabric with a solvent rubber cement composition comprising partially polymerized divinyl acetylene and rubber, the ratio of partially polymerized divinyl acetylene to rubber in said composition being in the range of 1:2 to 1:6 parts by weight, thereafter exposing the impregnated fabric to an oxygen-containing atmosphere to set said partially polymerized divinyl acetylene, and then vulcanizing a rubber composition in intimate contact with the so-treated fabric.

3. The method of making a composite article of rubber and cellulosic fabric which comprises the steps of impregnating said fabric with a water dispersed rubber composition comprising partially polymerized divinyl acetylene and rubber, the ratio of partially polymerized divinyl acetylene to rubber in said composition being in the range of 1:2 to 1:6 parts by weight, thereafter exposing the impregnated fabric to an oxygen-containing atmosphere to set said partially polymerized divinyl acetylene, and then vulcanizing a rubber composition in intimate contact with the so-treated fabric.

4. The method of making a composite article of rubber and cellulosic fabric which comprises the steps of impregnating said fabric with a liquid composition comprising partially polymerized divinyl acetylene and rubber, the ratio of partially polymerized divinyl acetylene to rubber in said composition being in the range of 1:2 to 1:6 parts by weight, thereafter removing the dispersing solvent of said composition and exposing the impregnated fabric to air to set said partially polymerized divinyl acetylene, and then vulcanizing a rubber composition in intimate contact with the so-treated fabric.

5. A composite article comprising vulcanized rubber and cellulosic fabric, and a film of bonding material therebetween said film serving to improve the adhesion of said rubber to said fabric, said bonding material comprising a mixture of rubber and a set synthetic drying oil selected from the group consisting of polymerized divinyl acetylene, polymerized mono-vinyl acetylene and their polymerized homologs, the ratio of set synthetic drying oil to rubber in said bonding material being in the range of 1:2 to 1:6 parts by weight.

6. A composite article comprising vulcanized rubber and cellulosic fabric, and a film of bonding material therebetween said film serving to improve the adhesion of said rubber to said fabric, said bonding material comprising a mixture of rubber and polymerized divinyl acetylene, the ratio of polymerized divinyl acetylene to rubber in said bonding material being in the range 1:2 to 1:6 parts by weight.

7. A tire having a body portion comprising vulcanized rubber and cellulosic fabric, and a film of bonding material therebetween said film serving to improve the adhesion of said rubber to said fabric, said bonding material comprising a mixture of rubber and polymerized divinyl acetylene, the ratio of polymerized divinyl acetylene to rubber in said bonding material being in the range of 1:2 to 1:6 parts by weight.

8. The method of making a composite article of cellulosic fabric and a rubber-like substance selected from the group of substances consisting of natural rubbers, polymerized 2-chloro-1,3-butadiene and polymerized butadiene compositions which comprises the steps of impregnating said fabric with a composition comprising said rubber-like substance and a synthetic drying oil selected from the group consisting of partially polymerized divinyl acetylene, partially polymerized mono-vinyl acetylene and their partially polymerized homologs, the ratio of synthetic drying oil to said rubber-like substance in said composition being in the range of 1:2 to 1:6 parts by weight, thereafter exposing the impregnated fabric to an oxygen-containing atmosphere to set said drying oil, and then vulcanizing a composition of said rubber-like substance in intimate contact with the so-treated fabric.

9. The method of making a composite article of rubber and cellulosic fabric which comprises the steps of impregnating said fabric with a composition comprising partially polymerized divinyl acetylene, rubber and an oxidizing agent, the ratio of the partially polymerized divinyl acetylene to rubber in said composition being in the range of 1:2 to 1:16 parts by weight, thereafter exposing the impregnated fabric to an oxygen-containing atmosphere to set said partially polymerized divinyl acetylene, and then vulcanizing a rubber composition in intimate contact with the so-treated fabric.

10. A composite article comprising cellulosic fabric and a vulcanized rubber-like substance selected from the group of substances consisting of natural rubbers, polymerized 2-chloro-1,3-butadiene and polymerized butadiene compositions, and a film of bonding material therebetween which film serves to improve the adhesion of said fabric to said rubber-like substance, said bonding material comprising a mixture of said rubber-like substance and a set synthetic drying oil selected from the group consisting of polymerized divinyl acetylene, polymerized mono-vinyl acetylene and their polymerized homologs, the ratio of set synthetic drying oil to rubber in said bonding material being in the range of 1:2 to 1:6 parts by weight.

BINGHAM J. HUMPHREY.

CERTIFICATE OF CORRECTION.

Patent No. 2,262,608.  November 11, 1941.

BINGHAM J. HUMPHREY.

It is hereby certified that error appears in the printed specification of the above numbered patent requiring correction as follows: Page 1, first column, line 13, for "units" read --unite--; page 4, second column, line 2, claim 9, for "1:16 parts" read --1:6 parts--; and that the said Letters Patent should be read with this correction therein that the same may conform to the record of the case in the Patent Office.

Signed and sealed this 23rd day of December, A. D. 1941.

(Seal)

Henry Van Arsdale,
Acting Commissioner of Patents.